United States Patent
Boss et al.

(10) Patent No.: US 7,620,905 B2
(45) Date of Patent: Nov. 17, 2009

(54) SYSTEM AND METHOD OF WINDOWS MANAGEMENT

(75) Inventors: Gregory J. Boss, American Fork, UT (US); Rick A. Hamilton, II, Charlottesville, VA (US); Aroopratan D. Pandya, Hopewell Junction, NY (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 11/279,794

(22) Filed: Apr. 14, 2006

(65) Prior Publication Data

US 2007/0245256 A1  Oct. 18, 2007

(51) Int. Cl.
  *G06F 3/048* (2006.01)
(52) U.S. Cl. ............... 715/768; 715/766; 715/781; 715/789; 715/790; 715/792; 715/793; 715/794; 715/795
(58) Field of Classification Search .......... 715/766, 715/768, 767, 781, 792, 793, 794, 795, 790, 715/789
  See application file for complete search history.

(56) References Cited

U.S. PATENT DOCUMENTS

| 5,377,317 | A | * | 12/1994 | Bates et al. ............... 715/789 |
| 5,805,163 | A | * | 9/1998 | Bagnas ...................... 715/768 |
| 5,841,434 | A | | 11/1998 | Arda et al. |
| 5,949,432 | A | | 9/1999 | Gough et al. |
| 5,973,688 | A | * | 10/1999 | May .......................... 715/709 |
| 6,072,489 | A | | 6/2000 | Gough et al. |
| 6,118,427 | A | * | 9/2000 | Buxton et al. ............. 345/629 |
| 6,333,753 | B1 | * | 12/2001 | Hinckley ................... 715/768 |
| 6,342,908 | B1 | * | 1/2002 | Bates et al. ............... 715/798 |
| 6,369,837 | B1 | | 4/2002 | Schirmer |
| 6,654,036 | B1 | * | 11/2003 | Jones ........................ 715/798 |
| 6,670,970 | B1 | | 12/2003 | Bonura et al. |
| 6,876,369 | B2 | * | 4/2005 | Brown et al. .............. 715/768 |
| 7,159,189 | B2 | * | 1/2007 | Weingart et al. .......... 715/799 |
| 7,257,777 | B1 | * | 8/2007 | Kanevsky et al. ......... 715/794 |
| 7,418,668 | B2 | * | 8/2008 | Lindsay et al. ............ 715/781 |
| 7,429,993 | B2 | * | 9/2008 | Hui ........................... 345/629 |
| 2001/0028368 | A1 | | 10/2001 | Swartz et al. |
| 2002/0180793 | A1 | | 12/2002 | Broussard |
| 2002/0186257 | A1 | | 12/2002 | Cadiz et al. |
| 2003/0117440 | A1 | | 6/2003 | Hellyar et al. |

(Continued)

FOREIGN PATENT DOCUMENTS

JP  2002-32168  1/2002

(Continued)

OTHER PUBLICATIONS

EaseXP, TransWin v.1.0.3, Mar. 8, 2006, www.fileheap.com.*

(Continued)

*Primary Examiner*—Tadesse Hailu
*Assistant Examiner*—Nicholas S Ulrich
(74) *Attorney, Agent, or Firm*—William E. Schiesser; Greenblum & Bernstein

(57) ABSTRACT

A system and method of windows management. The system and method comprises at least one window having information displayed thereon and a processor for determining an application type associated with the at least one window and rendering the at least one window at a predetermined opacity level based on the application type.

38 Claims, 7 Drawing Sheets

U.S. PATENT DOCUMENTS

| | | | |
|---|---|---|---|
| 2003/0142132 A1 | 7/2003 | Brown et al. | |
| 2003/0142133 A1 | 7/2003 | Brown et al. | |
| 2003/0189597 A1 | 10/2003 | Anderson et al. | |
| 2004/0090467 A1* | 5/2004 | Bonura et al. | 345/790 |
| 2004/0210847 A1 | 10/2004 | Berson et al. | |
| 2004/0212640 A1 | 10/2004 | Mann et al. | |
| 2004/0255254 A1 | 12/2004 | Weingart et al. | |
| 2004/0261038 A1 | 12/2004 | Ording et al. | |
| 2005/0010871 A1* | 1/2005 | Ruthfield et al. | 715/712 |
| 2005/0102631 A1 | 5/2005 | Andreas et al. | |
| 2005/0125739 A1 | 6/2005 | Thompson et al. | |
| 2005/0138569 A1 | 6/2005 | Baxter et al. | |
| 2005/0149879 A1 | 7/2005 | Jobs et al. | |
| 2005/0166158 A1 | 7/2005 | Blanchard, III et al. | |
| 2005/0210400 A1 | 9/2005 | Hoe-Richardson | |
| 2006/0036962 A1* | 2/2006 | Jobs et al. | 715/765 |
| 2006/0048067 A1* | 3/2006 | DeSpain et al. | 715/768 |
| 2006/0184891 A1* | 8/2006 | Parker et al. | 715/767 |
| 2006/0190838 A1* | 8/2006 | Nadamoto | 715/781 |
| 2006/0236255 A1* | 10/2006 | Lindsay et al. | 715/766 |
| 2006/0242602 A1* | 10/2006 | Schechter et al. | 715/838 |
| 2006/0248404 A1* | 11/2006 | Lindsay et al. | 714/38 |
| 2006/0253791 A1* | 11/2006 | Kuiken et al. | 715/766 |
| 2006/0294475 A1* | 12/2006 | Holecek et al. | 715/781 |

OTHER PUBLICATIONS

Miah et al., Vanishing Windows, Jan. 17, 2000, sciencedirect.com.*

* cited by examiner

SYSTEM AND METHOD OF WINDOWS MANAGEMENT

FIELD OF THE INVENTION

The invention generally relates to a system and method of window management and, more particularly, to a system and method of managing active and inactive windows in a desktop environment.

BACKGROUND OF THE INVENTION

Personal computers, laptop computers and other devices with graphical user interfaces have become ubiquitous in today's society. The graphical user interface, e.g., windows or panes, is an important aspect of computing, which allows the user to effectively interface with the device to input commands and data and receive results.

The success of this type of interface is evident from the number of users. However, with many new applications and products being introduced it is becoming evident that there is a need to more effectively manage the desktop environment. Also, with the advent of pop-up windows, adware, etc. there is becoming a demand to add additional functionality and greater ease of use from the desktop environment.

Most interfaces use "windows" and "icons" to help manage computer information on the desktop. However, much time is wasted managing a windows based desktop. In some instances, for example, the user might have 20 to 40 windows open at a time, which is difficult to manage. Management of the desktop becomes even more difficult when pop-up ads and pop-up based applications, e.g., Instant Messenger, appear and cause erroneous typing, i.e., typing text into the wrong window. In fact it is not uncommon that new windows are often lost when they appear (if they are preprogrammed such that immediate focus is not desired).

In order to ensure that an end user sees all new windows, the "always force window on top" option must be set. However, those familiar with this functionality know that the new windows typically interfere with the active window and cause disruption. So, to manage the desktop, many users allow for selection of a window based upon a textual window name in the taskbar. Also, the user has the capability to use the "Alt-Tab" key sequence to toggle or scroll through all the windows in a "most recently used easier to access" fashion. If the user has a large number of windows open, this process takes time.

Another function that increases the manageability of the windows themselves is the "Tile Windows," "Cascade Windows," and "Minimize All Windows." These functions simply clear the desktop of all windows or move windows. For example, when "Cascade Windows" is used the title bars of most or all windows is visible; and when "Tile Windows" is used, each window is made much smaller to be able to tile them across the desktop.

In the organization scheme described, it is appreciated that files can be nested within windows and windows can be nested within other windows, etc., leading to confusion and lost windows. For example, windows may overlap and partially, or entirely, hide other windows or icons. The result is that particular windows may be hidden behind several layers of windows and may be difficult to access. This has been referred to as the "window overlap" problem.

Accordingly, there exists a need in the art to overcome the deficiencies and limitations described hereinabove.

SUMMARY OF THE INVENTION

In a first aspect of the invention, a computer system comprises at least one window having information displayed thereon and a processor for determining an application type associated with the at least one window and rendering the at least one window at a predetermined opacity level based on the application type.

In another aspect of the invention, a computer system includes at least one window having information displayed on a graphical user interface. A processor determines an activity on the at least one window and adjusts an opacity level of the at least one window based on the activity. The inactive windows are rendered at a lower opacity than that of an active window of the at least one window. The processor renders the active window at a lower opacity level based on a predetermined time period of inactivity and returns the opacity level to a higher or original level based on an activity occurring in the window.

In yet another aspect of the invention, a method includes determining a number of windows open in a desktop environment and iteratively operating on the number of windows to:

determine a time period each of the number of windows has been open;

determine whether each of the number of windows is active or inactive; and decrease an opacity of one or more windows of the number of windows, respectively, as each of the one or more windows is found to be inactive, and incrementally decrease the opacity after a predetermined time of inactivity has passed.

In another aspect of the invention, a method for deploying computing infrastructure includes integrating computer-readable code into a computing system. The code in combination with the computing system is capable of performing a process of managing windows comprising determining a number of windows open on a desktop and iteratively operating on the number of windows. The operating includes determining a time period each of the number of windows has been open and determining whether each of the number of windows is active or inactive. The operating further includes decreasing an opacity of one or more windows of the number of windows, respectively, as each of the one or more windows is found to be inactive, and incrementally decreasing the opacity after a predetermined time of inactivity has passed.

In another aspect of the invention, a computer program product comprising a computer useable medium having a computer readable program executes on a computer causing the computer to perform the method step(s) of the invention.

DETAILED DESCRIPTION OF EMBODIMENTS OF THE INVENTION

The invention is directed to a system and method of managing windows in a desktop environment. The invention can be implemented on a workstation, portable device or any known device having a graphical user interface. In one implementation, the system and method can be provided by a service provider as an added value feature, based on a subscription fee or other type of structure.

In aspects of the invention, the system and method is a complete and full management tool to manage all applications on a desktop, i.e., active (focused) windows and inactive windows, based on different criteria alone or in combination. These criteria may include, for example, (i) the type of application launching the window, (ii) a predetermined amount of time each window is on the desktop, (iii) the number of windows on the desktop, (iv) the control preferences of a user, and (v) an activity occurring within an active window (e.g., placement of the cursor), etc. The system and method, in implementation, will run on any known operating system such as Unix™ (UNIX is a registered trademark of The Open Group in the United States and other countries), Windows® (Windows is a trademark of Microsoft Corporation in the United States, other countries, or both), Linux™ (Linux is a trademark of Linus Torvalds in the United States, other countries, or both), etc.

Figure 1A:
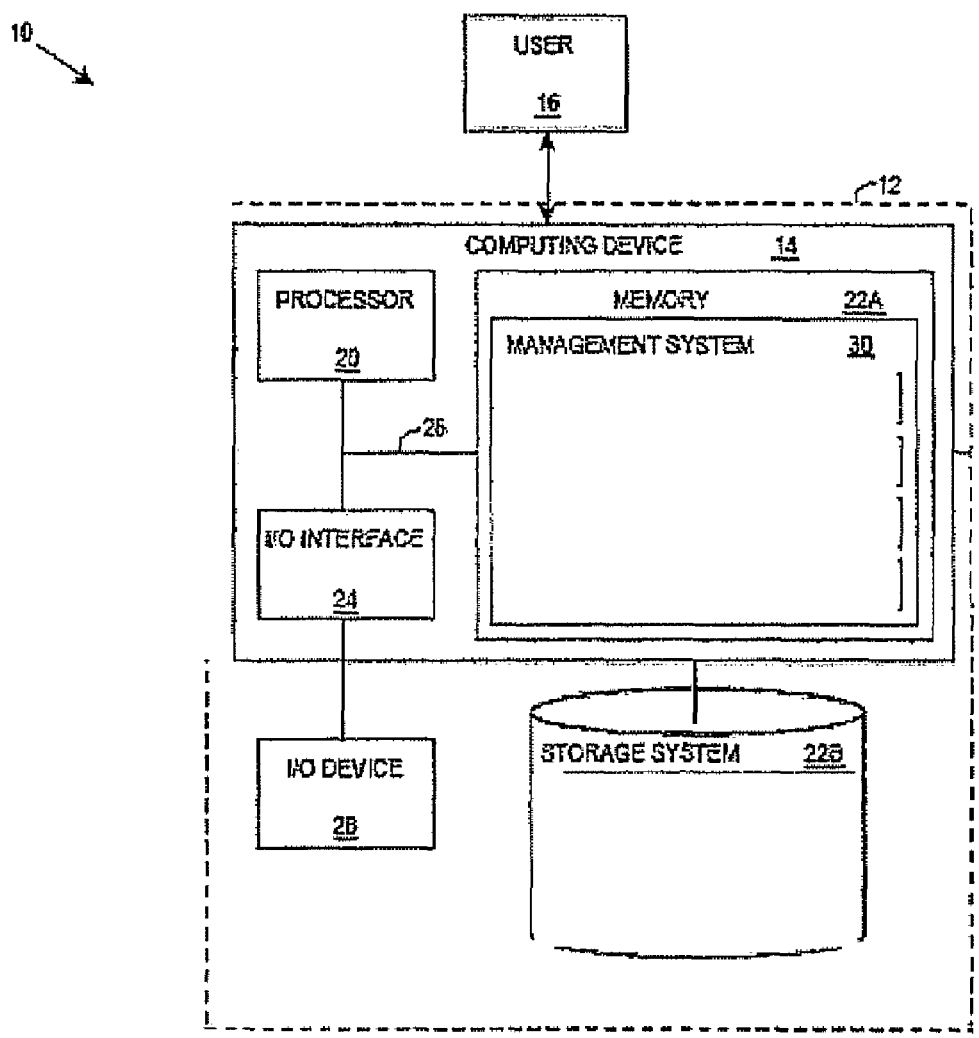
FIG. 1a shows an illustrative environment for managing the processes in accordance with the invention.

FIG. 1a shows an illustrative environment 10 for managing the processes in accordance with the invention. To this extent, the environment 10 includes a computer infrastructure 12 that can perform the processes described herein. In particular, the computer infrastructure 12 is shown including a computing device 14 that comprises a management system 30, which makes computing device 14 operable to perform the processes described herein. The computing device 14 is shown including a processor 20, a memory 22A, an input/output (I/O) interface 24, and a bus 26. Further, the computing device 14 is shown in communication with an external I/O device/resource 28 and a storage system 22B. As is known in the art, in general, the processor 20 executes computer program code, which is stored in memory 22A and/or storage system 22B. While executing computer program code, the processor 20 can read and/or write data, such as the business solution 50, to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

In any event, the computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in one embodiment, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols.

Figure 1B:
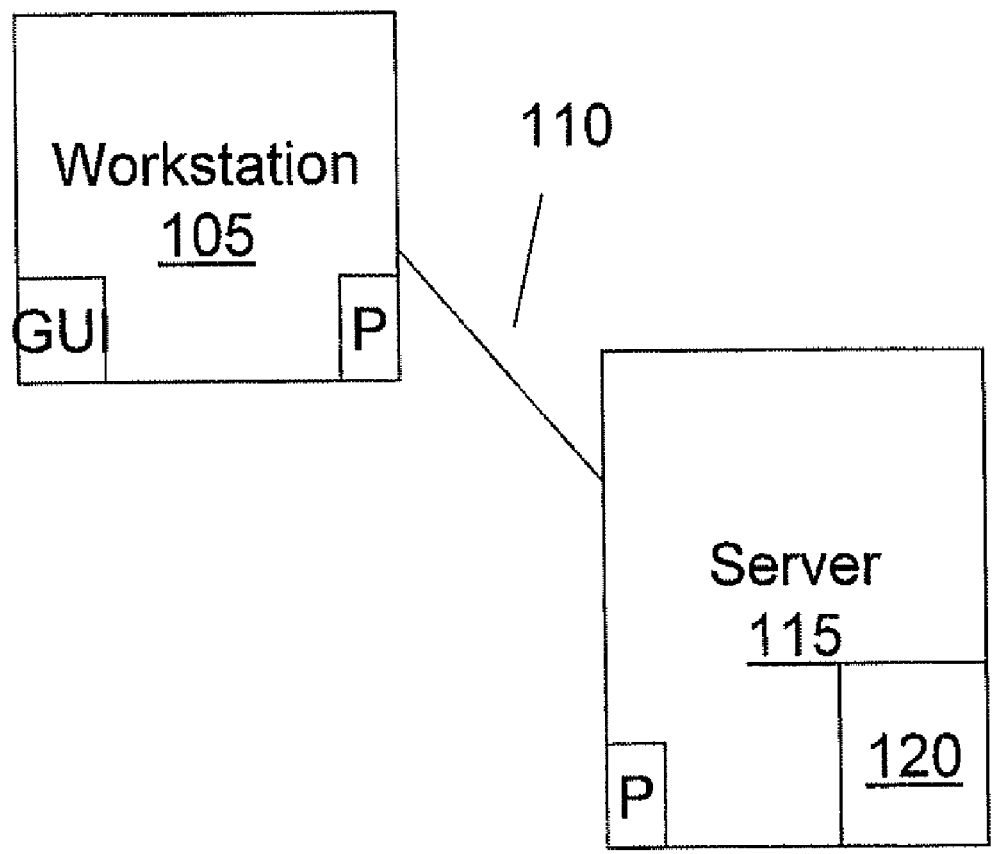
FIG. 1b is a block diagram of an embodiment of the invention.

FIG. 1b is a block diagram of an embodiment of the invention, generally denoted by reference numeral 100. Similar to FIG. 1a, the components of FIG. 1b may be used to implement the processing of the invention, as discussed more fully below. The invention includes at least one user workstation 105 (i.e., a any type of computer having a graphical user interface) which typically has a memory (RAM and/or ROM), a storage device (for example, a hard drive, DVD drive, or the like), processor (P), a graphical user interface (GUI), and accompanying components and systems (e.g., mouse, trackball, keyboard, etc.), all well known to those of skill in the art. The user workstation 105 may be connected via a network 110 (e.g., a local area network (LAN), a wide area network (WAN), wireless network, or the Internet) to one or more server 115. FIG. 1b further shows at least one service provider 120, which can provide the service of the system and method of the invention. The processor can implement the processes of the invention, as discussed below.

By using the system and method of the invention, implemented on the workstation or illustrative environment described above, for example, the user can manage the desktop environment to maximize user efficiency and/or maximize the real estate of the desktop. By way of example, the system and method provides the following features:

- adjust the opacity of the window based on whether the focus of the window is active or non-active;
- adjust the positioning of the window based on whether the focus of the window is active or non-active;
- adjust the positioning of a pop-up window based on a position of activity occurring in an active window;
- provide a screen representation on the taskbar;
- control user preferences of screen placement and opacity based on application type and/or time preferences, e.g., provide weights; and
- control all active applications with a single desktop management tool.

In view of the above features, it should be understood by those of skill in the art that the system and method of the invention increases the productivity of the user, and provides for notification that a window is present, whether solicited or unsolicited. Additionally, since the need does not exist to manage each window as it appears by minimizing or cascading or tiling, less time is spent on managing the windows themselves.

By way of one illustration, a window may be given a default opacity, e.g. 50%, when it appears on a desktop. If the focus of the window is adjusted and becomes the active window, its opacity may then be adjusted to a 100%. This default opacity value may be lowered or raised depending on the specific applications, e.g., providing a weight to certain applications. Illustratively as one non-limiting example, if new pop-up windows appear from pop-up based applications and applets, they may be given a lower opacity value than the default, e.g. 15%, so as to not interfere with the primary window. In implementations, even if the new window appears in the middle of the active window, the focus of the new window will not change and will not interfere with the current work in progress on the active window.

Figure 2:
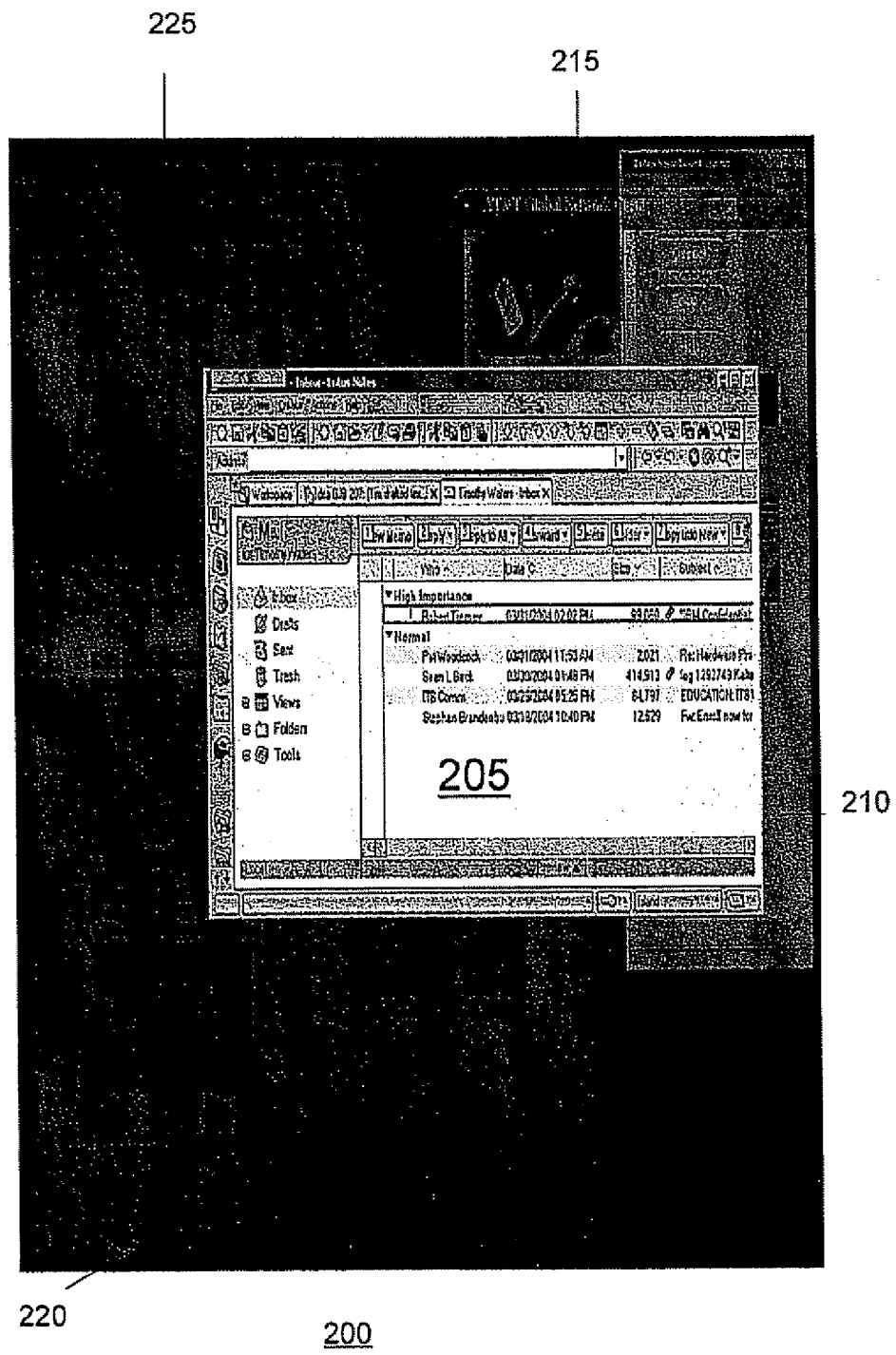
FIG. 2 is a representation of a graphical user interface (GUI) implementing an embodiment of the invention.

To further describe the above features, FIG. 2 shows a desktop with windows with different opacity values. In FIG. 2, the desktop is represented as reference numeral 200. By implementing the system and method of the invention, the active window 205 will be opaque with the remaining windows 210, 215, 220, 225 having different opacity values, e.g., transparencies, depending on the application, the time of inactivity on the desktop, etc. In the embodiment of FIG. 2, the opacity levels may be set as a default value or based on user preferences, depending on any number of variables such as, for example, (i) the type of application using the window, (ii) a predetermined amount of time each window is on the desktop, (iii) the number of windows on the desktop, etc.

As shown in FIG. 2, when a window appears from a user initiated application, it is given a default opacity, e.g. 80%, and is given active focus. This may be representative of window 210. If new pop-up windows appear from pop-up based applications, applets, adware, etc., they may be given a lower opacity value than the default, e.g. 10%. This may be representative of window 215. A non-active focus would be given a slightly higher focus, e.g. 50%, which may be representative of windows 220 and 225. The intent is to provide for notification or reminder that a new window has appeared or already exists somewhere on the user desktop, without disrupting the work flow of the user.

In this embodiment, the opacity levels will be decreased based on the inactivity time of the window. For example, a counter may be provided to determine the length of non-activity of a window. Illustratively in one non-limiting example, a window that is inactive for five minutes may have an opacity value of 50%; whereas, the opacity value may be decreased to 40% at 10 minutes.

In one implementation, once the window becomes active, e.g., the user begins working with the specific application, the window will become opaque, regardless of any counters, etc. which may be used to determine the inactivity of the window. The window will remain opaque during use; although, it should be understood that the window, when inactive for a certain predetermined time period has elapsed, e.g., five minutes, may begin to become transparent, less than that of an active window. In one embodiment, the system and method of the invention may allow one or more windows to remain completely opaque, depending on the preferences of the user.

In further implementations, as the number of windows grows, an additional enhancement to the system and method provides for an intelligent and periodic placement or reorganization of the non-active windows on the desktop. In this implementation, the system and method adjusts the placement, size, and opacity of a window based on the order of use and when it was last active. For example, as shown in FIG. 2, the non active windows 210, 215, 220, 225, will be placed remotely from an active portion of the focused window 205. Also, some windows, e.g., 215, may be sized smaller than other windows, e.g., 205, based on its application, time of inactivity, user preferences, etc. In the example of FIG. 2, as an illustration, window 215 is an adware which has less importance than that of the active window 205 and, as such, the window 215 is of a lower opacity and a smaller size. This ensures that the adware window 215 does not interfere with other windows during use, which may disrupt the user.

In further embodiments, the system and method may adjust the windows to treat the pop-ups with a lower or any level of criticality. This may be done by changing the opacity or the placement of the window, itself. In the embodiments of the system and method, the user can adjust the window placement based upon specific application needs. For example, for more critical applications, e.g., Lotus Notes client, the system and method may maintain the opacity at 100% with a 100% size, regardless of any activity or other citeria; whereas, for less critical applications, e.g., web pages, the service could be programmed to use 20% opacity, resize to 50%, and move to the back of the window stack. (See, FIG. 3.) Thus, using the system and method of the invention, the default settings can be configured different for different windows thus providing an overall management system.

The system and method of the invention also allows for the ability of more granularity to adjust windows in real time based on not only which window has the focus but also where the focus is within that window. This allows other semi-transparent windows that are visible within the current "focus" or active window to be moved depending on where the mouse or cursor is within that "focus" or active window. For example, if the user is typing text in an email program and has three instant message windows appear in some level of transparency within the boundaries of the email window, the three semi-transparent instant message windows would move away from the cursor. In this way, these windows would have less tendency to interfere with the user's activities of typing the email, while still providing awareness of the instant messaging windows to the user. This movement, in embodiments, would happen in real-time so that if the user moves the cursor, etc. to another portion of the window (to add or edit text, etc.), the semi-transparent windows would move to another region. (See FIG. 2.)

Figure 3:
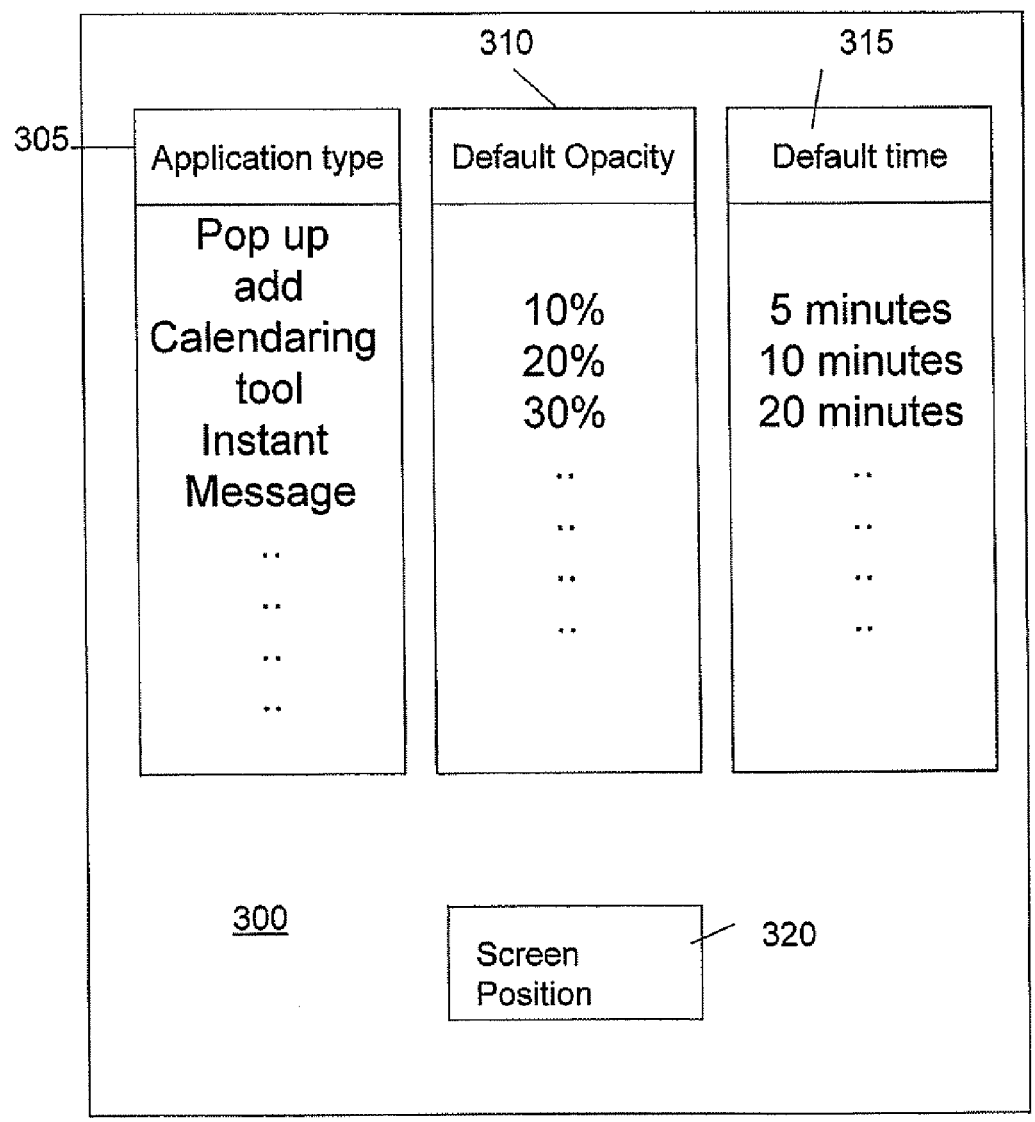
FIG. 3 is a representation of a GUI implementing an embodiment of the invention.

FIG. 3 shows a GUI in accordance the invention, in order to set default options. In this example, the GUI 300 includes several fields such as, for example, application type 305, default opacity 310 and default time 315. The application type field 305 may be associated with variables such as Pop up add, Calendaring tool, Instant Message to a host of other types of applications. The default opacity field 310 may provide different opacity levels, any of which may be selected for any application type. The default time field 315 may include different inactive time periods, any of which may be selected in order to set a time period for any application with any opacity level. FIG. 3 also provides an optional field 320, which allows the user to select specific desktop locations for different applications. Alternatively, the optional field 320 allows the user to select the option of having any new window appear remotely from an activity of the active window, thus ensuring that the user will not be disrupted by any newly appearing window.

Figure 4:
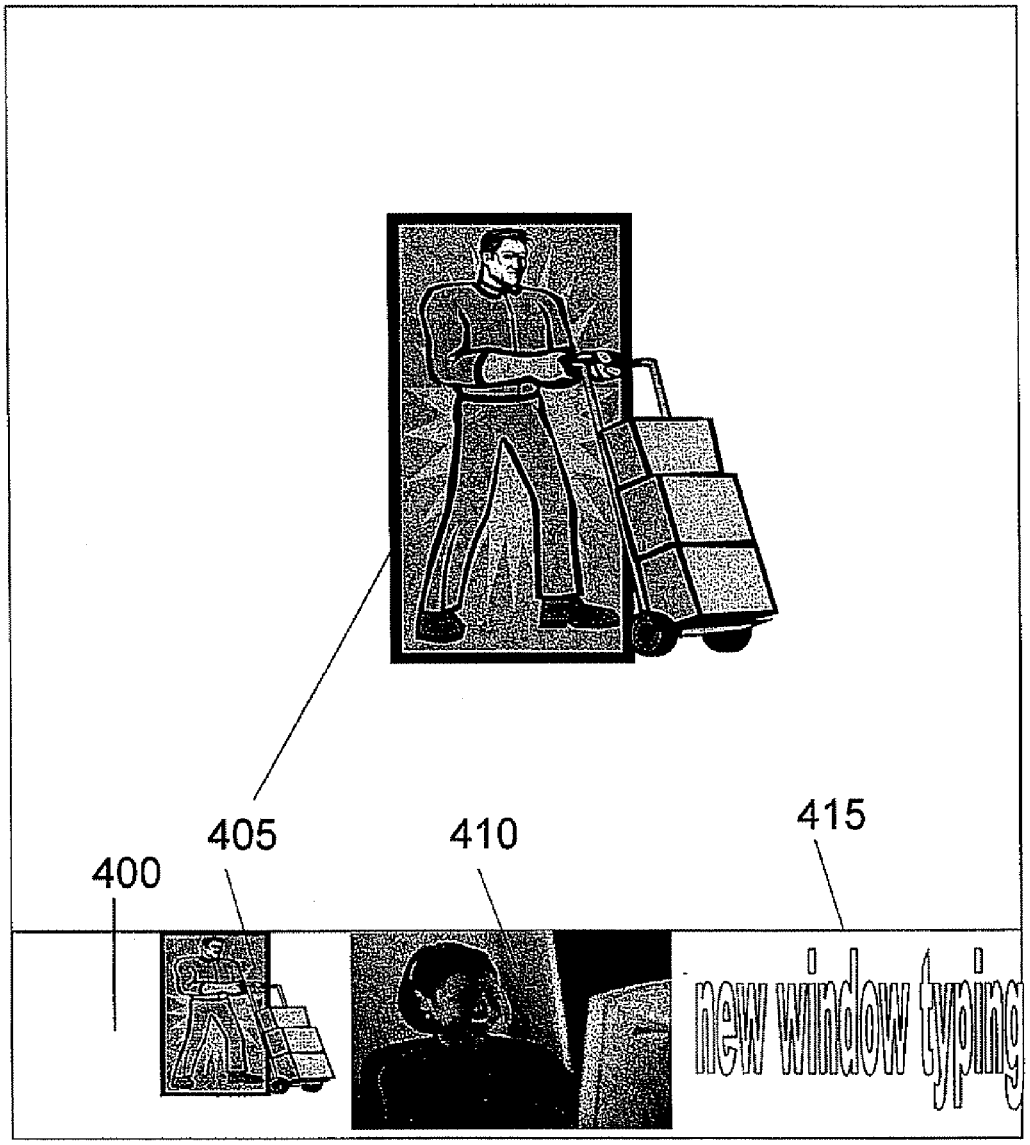
FIG. 4 is a representation of a GUI implementing an embodiment of the invention.

FIG. 4 shows an embodiment of the invention. In this embodiment, in addition to or separately from the embodiment of FIG. 2, the system and method of the invention provides an enhancement for the taskbar to make selection of the windows easier to manage. That is, the taskbar feature of the present invention enhances the manageability of the desktop by providing for an immediate change in focus to the correct window the first time; instead of selecting from the same general textual description or same icon where selecting the desired window is a trial and error method.

In particular, FIG. 4 shows miniaturized screen shots (similar to thumbnails of .jpeg files) of the active focused and non-focused windows in the taskbar; instead of textual and iconic descriptions. In this implementation, the taskbar 400 may be enlarged to accommodate the screen shots 405, 410, 415, etc. to enhance readability. In the representation shown, the active window 405 is both shown in the taskbar 400 and the desktop. The remaining icons may be placed only on the taskbar, as shown, or alternatively, may have some degree of transparency as discussed above. This enhancement equally applies to the "Alt-Tab" key sequence used to toggle between windows.

Figure 5:
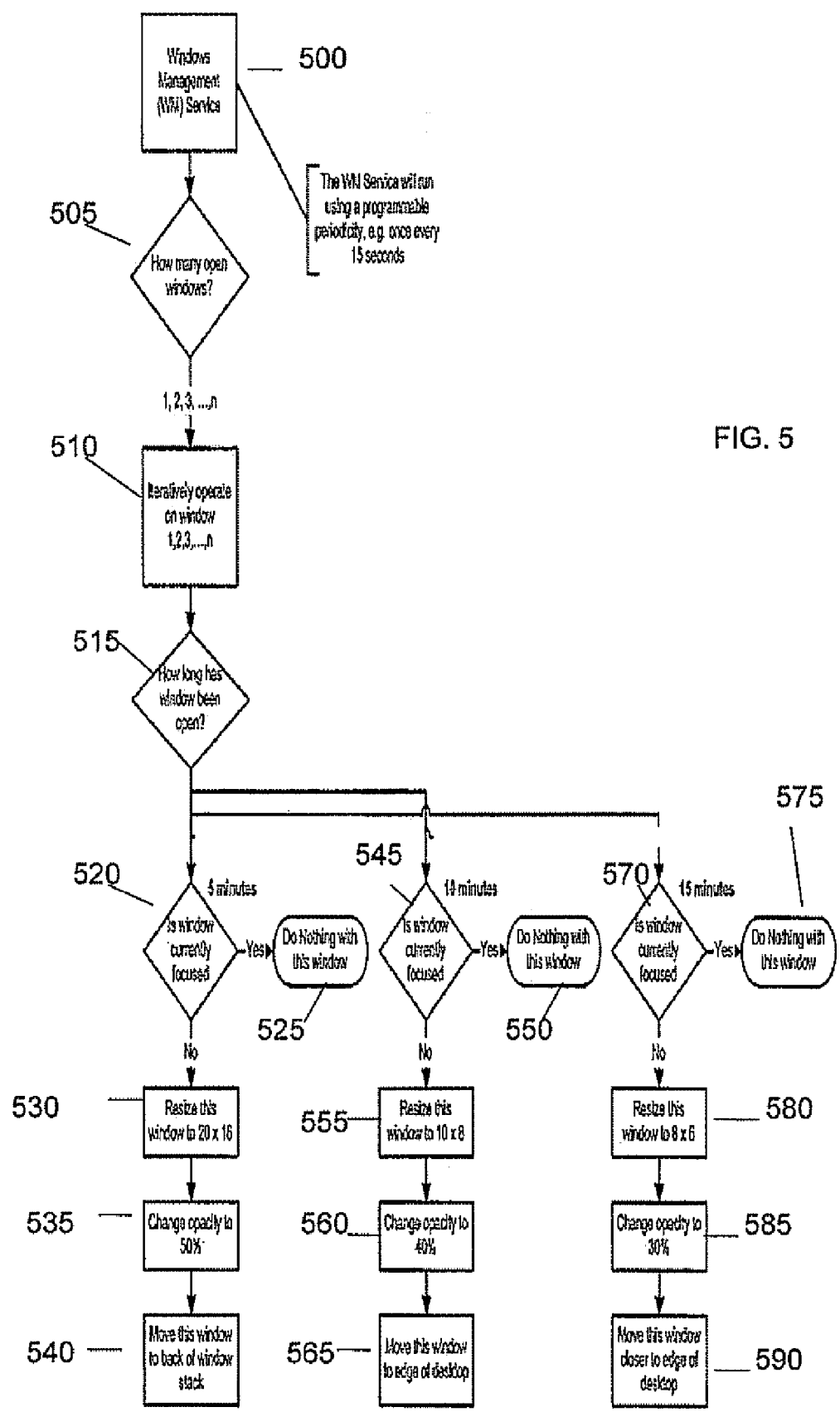
FIG. 5 is a representative flow diagram of steps for implementing aspects of the invention.

FIG. 5 shows a flow diagram implementing an aspect of the invention. FIG. 5 (and other flows described herein) is equally representative of a high level block diagram implementing the steps of the invention. The flow diagram(s) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM), all of which are represented in FIG. 1, for example.

In this representative flow, the system and method of the invention is activated after start-up, e.g., all windows are active. However, the process flow of FIG. 5 may be implemented at start-up and run in the background at periodic intervals, e.g., every minute, to actively monitor the desktop.

At step 500, the windows management system of the invention is activated. At step 505, the process (e.g., system and/or method of the invention) determines the number of windows that are actively opened on the desktop. At step 510, the process iteratively operates on windows, 1, 2, 3, ... n. In this manner, the process will, in successive order, determine a state of each window in order to take appropriate action.

It should be appreciated that the processing step of 510 may be implemented during the entire or any portion of the run-time of the process, regardless of when the system was launched. Additionally, the remaining steps are implemented for each window and may be the same regardless of when the system is initially launched.

At step 515, the process determines how long a window has been open. Depending on the outcome of step 515, the process may continue to any of the remaining steps. For example, if the process determines that the window is open for five minutes, the process will continue to step 520. At step 520, the process determines whether the window is active (e.g., focused). If the window is active, the process will end at step 525. If the window is not active, the process will (i) decrease the size to a first size, (ii) decrease the opacity to a first value, and (iii) move the window to a back of the window stack (tile) at steps 530, 535 and 540, respectively.

If the process determines that the window is open for ten minutes, the process will continue to step 545. At step 545, the process determines whether the window is active (e.g., focused). If the window is active, the process will end at step 550. If the window is not active, the process will (i) decrease the size to a first size, (ii) decrease the opacity to a first value, and (iii) move the window to a back of the window stack (tile) at steps 555, 560 and 565, respectively.

If the process determines that the window is open for five minutes, the process will continue to step 570. At step 570, the process determines whether the window is active (e.g., focused). If the window is active, the process will end at step 575. If the window is not active, the process will (i) decrease the size to a second size, (ii) decrease the opacity to a second value, and (iii) move the window to a back of the window stack (tile) at steps 580, 585 and 590, respectively.

As shown, the size and opacity of the window is decreased as the time of inactivity of the window increases. Also, this iterative process may continue for longer time periods or at different time periods, depending on the user or service preferences. Also, the example time periods, opacity levels, and sizing of the windows, as described above are provided as an illustration. It should be recognized by those of skill that the time periods, opacity levels, and sizing of the windows can vary in accordance with the invention, depending on many variable described herein. For example, adware windows may initially have a smaller size and lower opacity level than that of a more critical application, e.g., Lotus Notes However, in one implementation, regardless of the application, the opacity levels and sizing of the windows will decrease over a period of time, in embodiments.

Figure 6:
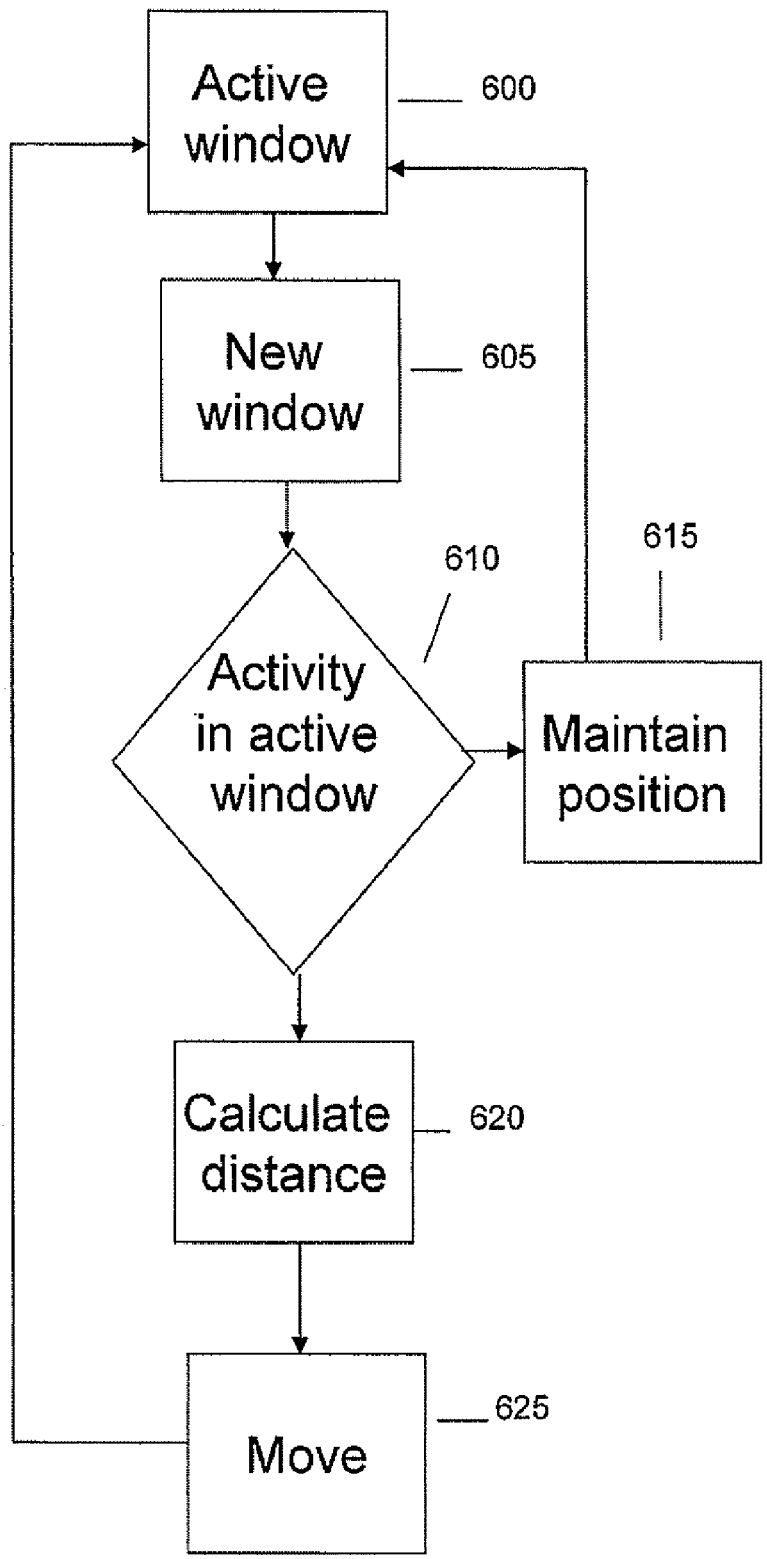
FIG. 6 is a representative flow diagram of steps for implementing aspects of the invention.

FIG. 6 shows a flow diagram of another implementation of the invention. The process steps shown in FIG. 6 are iteratively performed for each window, in one implementation similar to that described with reference to FIG. 5. At step 600, the location of an active window is identified and at step 605, the location of a new (or inactive) window is identified. Steps 600 and 605 may be interchangeable. At step 610, the process determines if there is any activity in the active window. If there is no activity, at step 615, the new (or inactive) window may remain in its location.

If there is activity in the active window, the process, at step 620, will determine the position of the activity. Once this is determined, at step 625, the process will calculate a distance from the activity such that the new (or inactive) window will not interfere or overlap with the activity on the active window. The process step 625 may take into account the size of the active window, the size of the inactive window and the placement of the inactive window at a remote location. At step 630, the inactive window is moved. After steps 615 and 625, the process may return to step 600.

In embodiments, the process may be implemented and executed from either a server, in a client server relationship, or they may run on a user workstation with operative information conveyed to the user workstation to create the navigation outlined above. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor (P) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

In another embodiment, the invention provides a business method that performs the process steps of the invention on a subscription, advertising, and/or fee basis. That is, a service provider, such as a Solution Integrator, could offer to manage the window desktop as described herein. In this case, the service provider can create, maintain, and support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While the invention has been described in terms of embodiments, those skilled in the art will recognize that the invention can be practiced with modifications and in the spirit and scope of the appended claims.

What is claimed is:

1. A computer system comprising:
   at least one window having information displayed thereon; and
   a processor for determining an application type associated with the at least one window, rendering the at least one window at a predetermined opacity level based on the application type, and for assigning one or more user defined weights based on the application type of the at least one window;
   wherein the processor allows a user to manage the at least one window by assigning the one or more user defined weights to the at least one window, and lowers an opacity level of the at least one window based on a predetermined period of time of inactivity of the at least one window.

2. The computer system of claim 1, wherein the processor maintains an opaque state of an active window of the at least one window.

3. The computer system of claim 1, wherein the processor determines a position of activity occurring on an active window of the at least one window, and moves inactive windows away from the activity.

4. The computer system of claim 1, wherein the processor iteratively determines a time of inactivity of n number of windows of the at least one window and sets an opacity level based on the time of inactivity.

5. The computer system of claim 4, wherein the processor renders an active window, which was previously inactive, to a higher opacity level, upon activity occurring in the previous inactive window.

6. The computer system of claim 5, wherein the processor, upon determining that the active window has been inactive for a predetermined amount of time lowers the opacity level.

7. The computer system of claim 1, wherein the processor iteratively operates on n+1 windows to determine a state of each window of the at least one window in order to adjust an opacity level of the each window based on a time period of inactivity.

8. The computer system of claim 7, wherein the processor resizes the n+1 windows to a smaller size based on a predetermined amount of time of inactivity.

9. The computer system of claim 7, wherein the processor tiles the n+1 windows behind an active window based on a predetermined amount of time of inactivity, wherein windows which are inactive for a longer time period are tiled behind windows that have been inactive for a shorter time period.

10. The computer system of claim 1, wherein the processor resizes n windows of the at least one window to a smaller size for each time period of inactivity.

11. The computer system of claim 10, wherein the processor tiles the n windows away from an active window of the at least one window.

12. The computer system of claim 1, wherein the processor determines if a window of the at least one window is inactive and decreases a size and opacity level of the window and moves the window to a window stack.

13. The computer system of claim 1, wherein user input is interpreted by the processor as operating in an active window and renders the active window in a fully opaque state.

14. The computer system of claim 1, wherein the processor renders a screen representation of the at least one window on a taskbar.

15. The computer system of claim 1, wherein the application type is an activity.

16. The computer system of claim 1, further comprising a user interface providing a user set of default parameters to set an opacity of a window based on at least one of a time of inactivity of the window and the application type.

17. A computer system comprising:
    at least one window having information displayed on a graphical user interface; and
    a processor for:
      determining an application type associated with the at least one window and rendering the at least one window at a predetermined opacity level based on the application type;
      determining an activity on the at least one window and adjusting the opacity level of the at least one window based on the activity, such that inactive windows are rendered at a lower opacity than that of an active window of the at least one window, the processor renders the active window at a lower opacity level based on a predetermined time period of inactivity and returns the opacity level to a higher or original level based on an activity occurring in the window; and
      assigning one or more user defined weights based on the application type to the at least one window;
        wherein the processor allows a user to manage the at least one window by assigning the one or more user defined weights to the at least one window.

18. The computer system of claim 17, wherein the processor lowers an opacity level of the inactive window based on a predetermined period of time of inactivity.

19. The computer system of claim 18, wherein the processor determines a position of the active window, and moves the inactive windows away from activity occurring within the active window.

20. The computer system of claim 17, wherein the processor iteratively determines a time of inactivity of n number of the inactive windows and sets an opacity level based on the time of inactivity.

21. The computer system of claim 17, wherein the processor resizes the inactive windows to a smaller size based on a predetermined amount of time of inactivity.

22. The computer system of claim 21, wherein the processor tiles the inactive windows such that the inactive windows which are inactive for a longer time period are tiled behind the inactive windows that have been inactive for a shorter time period.

23. The computer system of claim 17, wherein the processor determines when an activity occurs in a window and renders the window with the activity to an opaque state.

24. The computer system of claim 17, wherein the processor renders a screen representation of the at least one window on a taskbar.

25. The computer system of claim 17, further comprising providing a user interface which includes a set of default parameters to set at least one of an opacity and application type.

26. A method, comprising:
 determining a number of windows open in a desktop environment; and
 iteratively operating on the number of windows to:
  determine a time period each of the number of windows has been open;
  determine whether each of the number of windows is active or inactive;
  determine an application type associated with each of the number of windows and assign one or more user defined weights to at least one of the number of windows based on the application type;
  decrease an opacity of one or more windows of the number of windows that are open based on the application type of at least one of the number of windows, respectively, as each of the one or more windows is found to be inactive, and incrementally decrease the opacity after a predetermined time of inactivity has passed; and
  move the one or more windows that are found to be inactive away from the activity occurring on an active window.

27. The method of claim 26, further comprising decreasing a size of the one or more windows as each of the one or more windows is found to be inactive, and incrementally decreasing the size after a predetermined time of inactivity has passed.

28. The method of claim 26, further comprising moving each of the one or more windows to a back of a window stack after a predetermined time of inactivity has passed.

29. The method of claim 26, further comprising providing an incremental default value for the opacity of the one or more windows.

30. The method of claim 26, further comprising having a service provider charge a fee for providing services implementing steps of claim 26.

31. The method of claim 26, further comprising setting an opacity level based on an application which launches selective ones of the number of windows.

32. The method of claim 26, further comprising providing screen images of selective ones of the number of windows on a taskbar.

33. The method of claim 26, further comprising determining an activity occurring in a window and rendering the window with the activity to an opaque state.

34. A method for deploying computing infrastructure, comprising integrating computer-readable code into a computing system, wherein the code in combination with the computing system is capable of performing a process of managing windows comprising:
 determining a number of windows open on a desktop; and
 iteratively operating on the number of windows to:
  determine a time period each of the number of windows has been open;
  determine whether each of the number of windows is active or inactive;
  determine an application type associated with each of the number of windows and assign one or more user defined weights to at least one of the number of windows based on the application type;
  decrease an opacity of one or more windows of the number of windows that are open based on the application type of at least one of the number of windows, respectively, as each of the one or more windows is found to be inactive, and incrementally decrease the opacity after a predetermined time of inactivity has passed; and
  move the one or more windows that are found to be inactive away from the activity occurring on an active window.

35. The method of claim 34, wherein the deploying is provided by a service provider.

36. A computer program product comprising a computer useable storage medium having a computer readable program, wherein the computer readable program when executed on a computer causes the computer to:
 determine a number of windows open on a desktop;
 determine an application type associated with each of the number of windows;
 determine a time period each of the number of windows has been open;
 determine whether each of the number of windows is active or inactive;
 assign one or more user defined weights based on the application type to at least one of the number of windows to allow a user to manage at least one of the number of windows;
 decrease an opacity of one or more windows of the number of windows that are open, respectively, as each of the one or more windows is found to be inactive;
 and incrementally decreasing the opacity after a predetermined time of inactivity has passed.

37. The computer system of claim 1, wherein the computer system adjusts a placement, a size, and an opacity of the at least one window based on an order of use and when the at least one window was last active.

38. The computer system of claim 1, wherein the predetermined opacity level is based on a number of the at least one windows open on a desktop and an amount of time the at least one window is on the desktop.

* * * * *